May 12, 1942.  E. R. KUN  2,282,659
AUTOMATIC EXPOSURE CAMERA
Filed Oct. 3, 1940  3 Sheets-Sheet 1

INVENTOR
EUGENE R. KUN
BY Morris Spector
ATTORNEY

Patented May 12, 1942

2,282,659

UNITED STATES PATENT OFFICE 2,282,659

AUTOMATIC EXPOSURE CAMERA

Eugene R. Kun, La Crosse, Wis.

Application October 3, 1940, Serial No. 359,494

12 Claims. (Cl. 95—10)

This invention relates to cameras, and more particularly to cameras of the type provided with automatic means for controlling the relationship of the diaphragm opening and shutter speed in accordance with prevailing light conditions.

Under given light conditions the amount of light which reaches a photographic film in a camera is a function of the effective diaphragm opening and the speed of the shutter. The automatic camera adjusts one of the aforementioned variables after the other has been selected. In accordance with the preferred embodiment of the present invention the shutter speed is manually selected and the diaphragm opening is automatically adjusted. It is, however, to be understood that this selection is arbitrary, and the construction of the apparatus will remain essentially the same if the diaphragm opening is manually selected and the automatic device made to adjust the shutter speed.

It is one of the objects of the present invention to provide a mechanism for effecting automatic adjustment of one of the aforementioned variables under control of a photo cell, the mechanism to be so constructed as to eliminate all stress upon the electrical instrument itself.

Electric light responsive instruments of the type here involved consist of a cell which generates an electric current of a magnitude determined by the light intensity, which current is caused to flow through a galvanometer consisting of a coil of fine wire delicately mounted to turn in a strong permanent magnet field. The deflection of the coil depends upon the magnitude of the minute current flowing therethrough. Because the current generated is exceedingly small the coil must be supported by extremely delicate bearings and the moving mass must be made as light in weight as possible. It is difficult to use the end of the pointer as a stopping point for the mechanical movement that actually adjusts the diaphragm because the construction must be such that the delicate pointer itself is not put under mechanical strain. In accordance with the principles of the present invention auxiliary means is provided, which is controlled by the pointer of the light responsive instrument and which in turn controls the extent of opening or closing of the diaphragm.

It is a further object of the present invention to provide an automatic camera wherein the user has complete control of the camera and can adjust the relationship of the diaphragm opening to the shutter speed independently of the automatic mechanism. This permits the operator to alter the characteristics of the picture, such as focal depth, etc.

It is a still further object of the present invention to provide an automatic camera wherein the operator can ascertain the position to which the automatic mechanism has set the diaphragm opening before the picture is taken, and after ascertaining the diaphragm opening can avoid exposing the photographic film or change the diaphragm opening.

It is a further object of the present invention to provide an automatic camera with means for releasably locking the mechanism against film exposure in the event that the light conditions are insufficient for taking a proper picture. Thus the shutter release is locked whenever there is less light than necessary for the maximum lens opening and the selective shutter speed.

In commercial photo cells the magnitude of the current is not directly proportionate to the amount of light. The current generated is also dependent upon the total resistance of the electric circuit. Thus the combined resistance of the photo electric cell, recording instrument, and external resistances which are used to adapt the unit to the selective shutter speeds or to various film sensitivities will influence the output of the photo cell itself. To compensate for the electrical cnaracteristics of the photo cell I provide an electric responsive system which follows the characteristics of the photo cell closely. This can be achieved, for instance, by using a suitable density of the magnetic field in which the coil is deflected and by properly shaping the magnet and the air gap. The external resistances are provided to adapt the instrument to the selected shutter speed and to the selected film sensitivity. Instead of external resistances other means may be used, for instance, shutting of the photo cell itself, as shown by United States Patent No. 2,080,055, or by providing a variable magnetic shunt thereby making the electrical instrument more or less sensitive as determined by the shutter speed or the film sensitivity.

The attainment of the above and further objects of the present invention will be apparent from the following specification taken in conjunction with the accompanying drawings forming a part thereof.

In the drawings.

Reference may now be had more particularly to the drawings wherein like reference numerals refer to like parts throughout.

Figures 1, 4, 5:
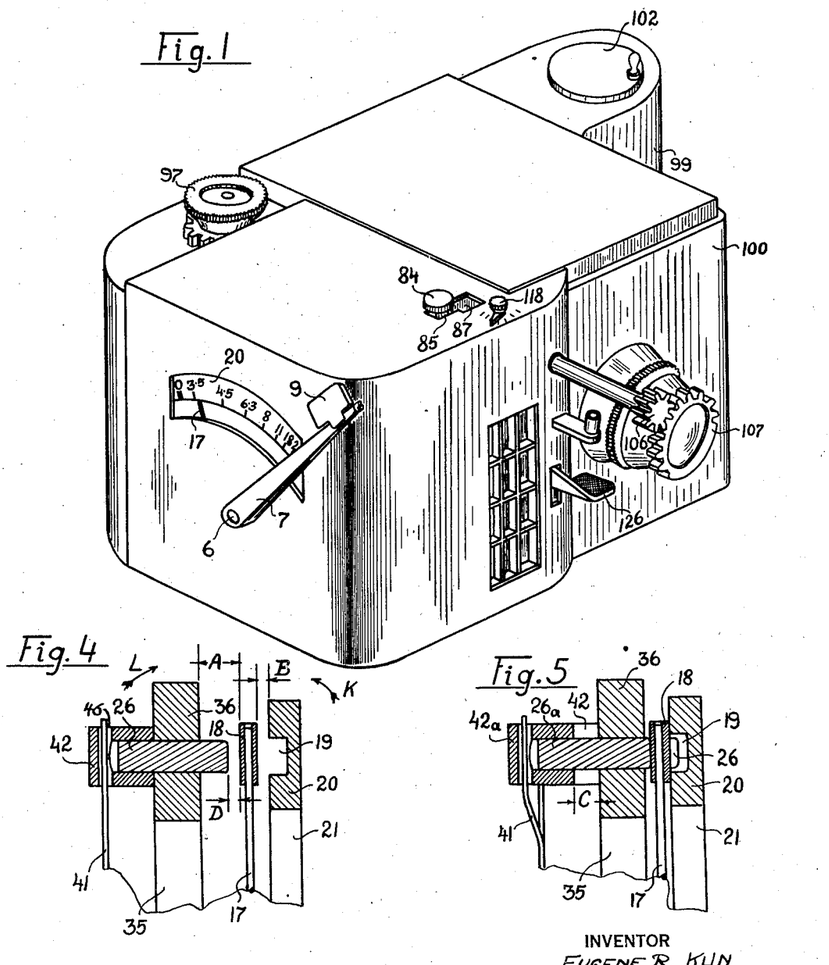
Figure 1 is a perspective view of a camera embodying the present invention.
Figures 4 and 5 are fragmentary views showing successive positions of the mechanism in relation to the needle of the electrical instrument.

In Figure 1 I have shown an automatic mechanism embodying the present invention applied to a standard reflex type camera. It is to be understood that the invention is equally applicable to other types of cameras. In the construction illustrated certain parts of the mechanism are exposed merely because the automatic mechanism is applied to an already made camera. If the automatic mechanism were to be built into the camera during the manufacture of the camera certain of the exposed parts would be concealed within the casing, as will be pointed out hereafter.

Figure 2:
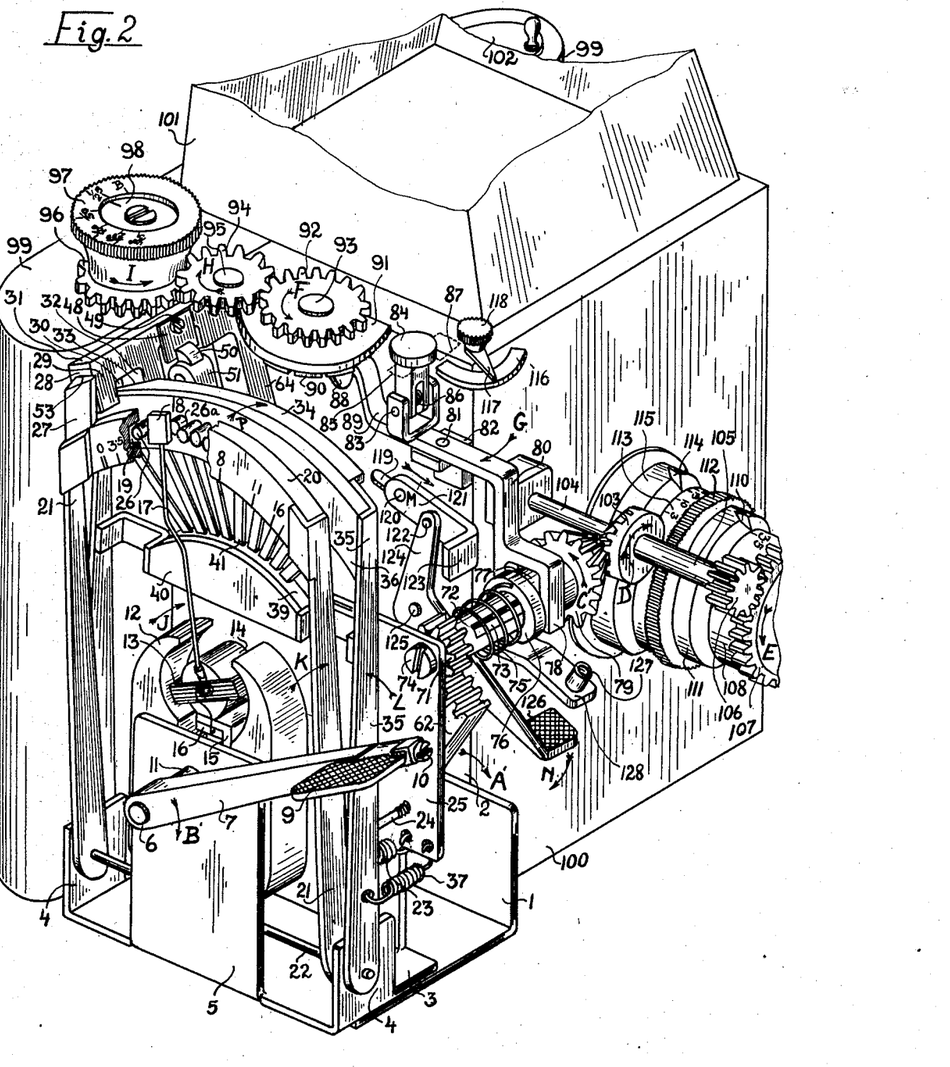
Figure 2 is a smiliar view of the camera with certain of the parts removed to expose the operating mechanism.
Figure 3:
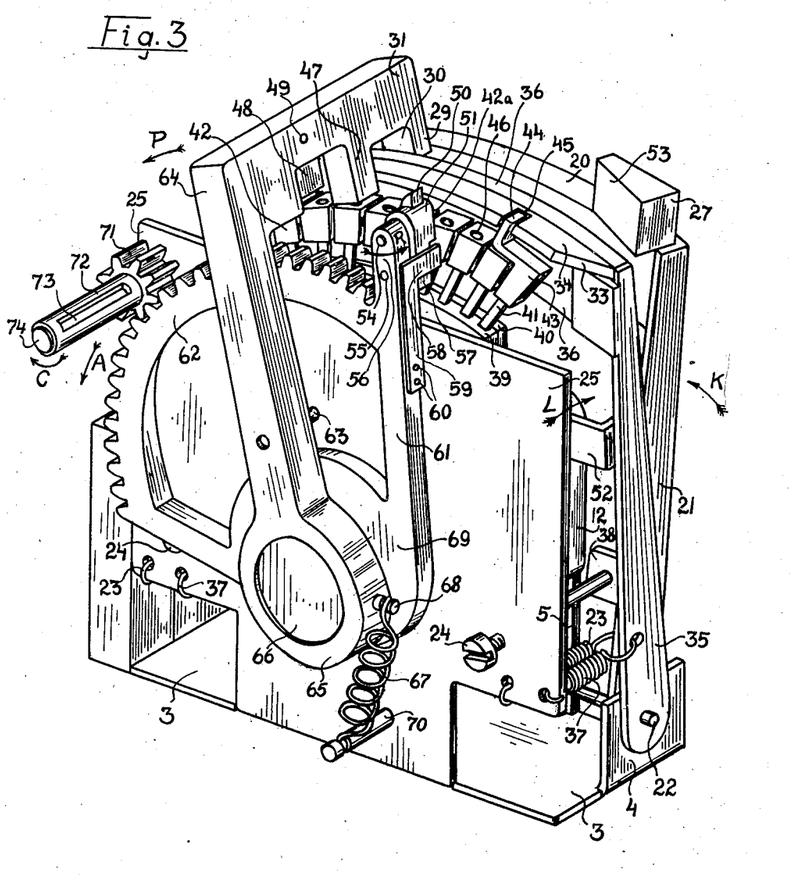
Figure 3 is an enlarged perspective of part of the mechanism of Figure 2 as seen from the opposite side.

The automatic mechanism is shown more fully in Figures 2 and 3. A carrying plate 1 (Fig. 2) is secured at one side to the body of the camera and is secured at its other side to one end of a main support 3, an opposite end or leaf 4 of which is also secured to the body of the camera. The main support 3 includes forward and rear leaves 4 and a side wall 5, all part of one integral stamping. An operating lever 7 has a mounting lug 6 at one end thereof and has a finger piece 9 pivoted thereto at the opposite end and held in place by a screw 10. The lug 6 seats in and is secured to a main shaft 11. Thus if the finger piece 9 is depressed the main shaft 11 is rotated in the direction of the arrow B (Fig. 2). The shaft extends through a hole or gap between the two sides of a stationary permanent magnet 12 which is a part of the galvanometer structure, and is supported by the walls 5 and 25 of the main frame 3. These walls serve as a bearing for the shaft 11 and prevent any axial motion while the shaft is rotated. The lever 7 is at the outer side of the camera in such a position that it can be controlled easily. The finger piece 9 is placed on the threaded screw 10 so that the finger piece can swing sideways and serve as a support for the finger depressing lever. After use, the finger piece may be swung back and will be substantially flush with the side wall of the camera, as illustrated in Figure 1.

The coil of the electric instrument is indicated at 13, said coil being around a stationary core 14. The coil 13 is supported by a two point bearing located within the core 14. The tips of these points support the coil in bearings, preferably jewel bearings, secured to the coil. The position of the points in the bearings may be regulated by moving them into or out of the core 14, to take up slack. This is a standard well known type electric galvanometer bearing construction for instruments of this type. In these and similar types of bearings the position of the coil is not rigidly secure because as the tips of the points wear with use the bearings and the coil are consequently tilted. If sufficient precision and large photo cells are used then it is possible to use the more robust sleeve type bearings, but even these are very sensitive and any damage to them would result in a tilt of the coil and pointer. In the present construction a reasonable amount of tilt of the coil is unobjectionable, as will be pointed out herein.

The core 14 is supported in any manner, as by an insulating plate 15 on a contact plate 16. A spiral spring connects the contact plate 16 with the coil 13 and serves as a current transmitter into the coil and has sufficient elasticity to bring the coil back to its zero current position. A pointer 17 is fastened to the coil 13 and carries a pin plate 18 at its tip. The plate 18 is preferably made of exceedingly light weight material, such as aluminum, by way of example. As the coil is deflected under the influence of current flowing therethrough, the pointer 17 with its plate 18 swings to a position determined by the magnitude of the current flow.

The diaphragm actuating mechanism, to be presently described, is controlled by the pointer 17 in such a way that it cannot deflect the pointer sideways or put any stress upon the pointer. To achieve this result there is provided a supporting plate 20 which has an arcuate groove 19 formed therein. The supporting plate 20 is mounted upon a frame 21 which is supported by and swings about a hinge formed by a shaft or pin 22 that extends between and is supported by the leaves 4—4. A spring 23 that extends between the frame 21 and the plate 25 urges the frame 21 to a normal position. Adjustable stops 24 are provided for limiting the extent or rotation of the frame 21. The stops 24 may comprise screws threaded through the wall or plate 25 and acting as abutment stops for lugs 38 secured to the frame 21 which carries the supporting plate 20. By rotation of these stopping screw members 24 the supporting plate 20 can be brought into any limiting position. The screws 24 are so adjusted that in the limiting position of the frame 21 the supporting plate 20 is brought just into contact with the pointer plate 18.

The groove 19 in the supporting plate 20 is narrower than the length or height of the pointer plate 18, as may be seen in Figure 4. Consequently when the plate 20 establishes contact with the pointer plate 18 the pointer plate is supported at its upper and lower rims which rest on the edge of the groove, as may be seen in Figure 5. The center of the pointer plate 18, is, however, opposite the center line of the groove 19.

The plate 20 has, in addition, a wedge-shaped lug 27 at one end thereof, as may be seen from Figures 2 and 3. This cooperates with a substantially straight side wall 28 of a lug 29 on a horizontal arm 31 of an actuating lever 64.

A second frame 35 is pivoted about the pin or shaft 22, said frame having a counter-plate 36 at the upper end thereof. The counter-plate 36 has a number of holes therein through which pins 26 slide. Springs 37 adjacent the springs 23 connect the frame 35 with the plate or wall 25, the arrangement being such that the bias of the springs 37 tends to return the frame 35 to its original position, that is, urge the frame 35 to swing about the pin 22 in a direction opposite that indicated by the arrow L. The pins 26 are slidably supported by the counter-plate 36. Each pin has a substantially wedge-shaped part 42 secured thereto. The wedge-shaped parts 42 of the pins 26 are constantly pressed towards the counter-plate 36 by flat leaf springs 41 one end of each of which is fastened between two clamping members 39—40. The opposite end of each spring 41 passes through an oversized slot 46 in the wedge-shaped pin head 42 of the associated pin 26. This provides a loose connection between each spring 41 and its pin head 42 so that the pins are free to glide in the plate 36 and will move strictly at right angles to the plate 36.

As the frame 35 is swung about the shaft 22 the counter-plate 36 swings towards the pointer plate 18 without touching it. The angle about which the frame 35 and counter-plate 36 swings is determined by the actuating member, which will be described later. For the present it is important to note that when the pointer is positioned the supporting plate 20 swings into contact with the plate 18 whereas the counter-plate 36 swings only towards the plate 18 and stops without touching it. The angle is so great that the pins 26 enter the groove 19 of the supporting plate 20 without, however, touching the bottom of the groove 19. The pin 26a which happens to be opposite the pointer plate 18 is, however, prevented from entering the groove 19 because that pin 26a abuts the pointer plate 18. It is obvious that the pointer plate 18 and the pointer system of the galvanometer will not be put under any stress because the slight pressure that is put on the pointer plate 18 by the pin 26a is completely absorbed by the supporting plate 20 so that no pressure of the pin on the plate 18 is transmitted through the pointer 17 to the system of the electrical instrument. This is an important feature of the present invention.

Figures 4 and 5 illustrate this action. The supporting plate 20 with its groove 19 is originally at a distance B from the pointer plate 18. The tips of the pins 26 are at a distance D from the pointer plate 18. These distances are sufficient to allow complete freedom of swinging of the pointer plate clear of the plate 20 and the pins 26 even though there may be any reasonable amount of tilting of the pointer 17 due to imperfections or wear in the bearings. This allows the galvanometer needle complete freedom of motion. When the mechanism is actuated, in a manner to be presently described, the supporting plate 20 is first swung towards the pointer in the direction of the arrow K (Fig. 4). The amount of swing of the supporting plate 20, as determined by the adjustable stopping members 24, is such that the supporting plate is swung just into contact with the pointer plate 18, that is, it is moved the distance B. The counter-plate 36 then swings towards the pointer in the direction of the arrow L of Figure 4, the distance of travel being indicated at A. As can be seen from Figure 5, the pins 26 enter the groove 19 whereas one pin 26a (or perhaps two adjacent pins) is stopped by the pointer plate 18. Consequently the particular pin 26a and its head 42a will be pushed out on the other side of the counter-plate 36, as illustrated in Figure 5.

As a matter of fact the groove 19 is not indispensable in the present construction, for if the pointer plate 18 is made sufficiently thicker then this alone would account for the necessary amount of protrusion, indicated at C, of the pin head 26a. However, since the pointer plate should be made as light as possible it follows that it should also be as thin as possible. For this reason the groove 19 is provided to increase the distance or the difference in travel between the pins which are not held up and the one (or two) which hits the plate 18. Thus all the pins, excepting the one hitting the plate 18, will be moved towards the right by an amount almost equal to A, whereas the hitting pin will move only by the amount D.

The arm 31 also has a lug 47 and carries a spring plate 48 constituting a ratchet spring riveted thereto as at 49. This spring plate co-operates with a top nose piece 50 at the end of a pawl 51 pivoted at 54 to an arm 56. The pawl 51 has a lug 57 that cooperates with a pin 55 in the arm 56 to stop the movement of the pawl. The lug 57 is under pressure of a side arm 58 of a flat spring 59 which is riveted as by a rivet 60 to the arm 61 of a gear disc 62. The disc 62 is journalled on the shaft 11 but not connected to the shaft, so that can be swung around the shaft independently of the movement of the shaft 11.

The arm 31 constitutes the upper end of a main actuating lever 64 which is keyed to the shaft 11 as by a disc 66 which is secured to the shaft and which is also fastened to the ring-shaped lower part 65 of the main actuating lever 64. A coil spring 67 which extends between a pin 68 on the main actuating lever 64, and a pin 70 on the stationary plate 25 constantly urges the main actuating lever 64 to the position illustrated in Figure 2, that is, in a direction contrary to that indicated by the arrow P.

The disc 62 has gear teeth thereon, as illustrated in Figure 3, which teeth mesh with a pinion 71 which has a sleeve 72 rigid therewith and slotted as at 73. The sleeve 72 is rotatably mounted on a shaft or pin 74. Thus whenever the disc 62 is rotated the pinion 71 and shaft 72 are also rotated, and in an amount determined by the extent of rotation of the disc 62. The pinion 71 on the shaft 72 rotates a bevel gear 79 in mesh with a bevel gear 103 to vary the diaphragm opening.

In order to permit manual disconnection of the automatic diaphragm adjusting apparatus means is provided for disengaging the gears 79—103 manually. A coil spring 75 surrounds the sleeve 72 (Fig. 2) and constantly pushes against a flange 76 of a collar 77 which is slidable axially of the sleeve against the action of the spring 75. A U-shaped member 78 loosely embraces the collar and bears against the flange 76 to slide the collar 77 on the shaft 72 against the action of the spring 75. The collar 77 also carries at its opposite end the gear 79. The collar 77 is non-rotatable with respect to the sleeve 72, being locked to the sleeve by a pin which passes from the collar into the slot 73, thus permitting the collar to move axially along the sleeve but maintaining the collar locked to rotate with the sleeve. When the collar is in the position to which it is urged by the spring 75 the bevel gear 79 is in mesh with the bevel gear 103. When the collar is moved along the sleeve 72 towards the pinion 71, against the action of the spring 75, it moves the bevel gear 79 out of engagement with the bevel gear 103. The collar and bevel gear thus constitute a clutch connecting the pinion 71 with the gear 103. The U-shaped member 78 for actuating the collar 77 is the lower part of a lever 80 which is pivotally mounted on a pivot pin 81 secured to an angle piece 82 which in turn is fastened to the camera housing as illustrated in Figure 2. The other side of the lever 80 has a U-shaped clip secured thereto which provides a horizontal pivot 83 serving as a hinge for a vertical button-like member 84. A coil spring 86 biases the member 84 to tilt in a direction to the right as seen in Figures 1 and 2. The cover or casing of the mechanism is provided with a narrow slot 85 having a broader portion 87. The member 84 may be moved in the slot 85 towards the broad portion 87 and then swung in the slot to the right as seen in Figure 1, where it is held by the spring 86. Movement of the vertical button member 84 to the portion 87 of the slot causes the lever 80 to swing around the pivot 81 so that the U- shaped member 78 moves the collar 77 to disconnect the bevel gear 79 from the gear 103. If the button 84 is manually released from the broad portion 84 against the action of the spring 86 it can then be moved back into the narrow portion of the slot 85 which catches and holds the member 84 and returns the gear 79 into mesh with the gear 103. This action is facilitated by the spring 75.

Besides this voluntary or manually actuated disconnecting means for the operating mechanism there is provided means for disconnecting the automatic diaphragm adjusting mechanism whenever the shutter timing mechanism is set for a time exposure. This may be necessary whenever there is insufficient light for proper exposure at the lowest possible shutter speed even with the diaphragm wide open. In this case a longer time exposure is necessary, and the camera speed selector 97 must be set to "timed shutter release," that is, to a position such that the shutter is opened by the pressure on the shutter tripping mechanism and remains open until the pressure on the shutter tripping mechanism is released. In this way the time of exposure is deliberately determined by the user of the camera and may be of any duration. The time selector knob 97 is then set to the mark "B." If the "B" timing of the selector 97 has been chosen then the coupling between the gears 79—103 is interrupted as follows: When the shutter speed selector 97 is turned it must be raised axially. Through the lifting action the teeth of a cog wheel or gear 96 grip with the teeth of a pinion 94 which is thus turned with the turning of the knob 97, and in the direction of the arrow H. This releasable connection between the gear 94 and the pinion 96 is necessary only when the knob 97 rotates during exposure. If the camera is such that the knob 97 does not rotate during exposure then the gear 96 may be permanently in mesh with the pinion 94. As the pinion 94 is rotated it rotates a cog wheel 92 keyed to a pivot shaft 93. The cog wheel 92 rotates in the direction of the arrow F. A contact spring 88 with a hook-shaped downturned end is secured to the lower end of the pivot shaft 93. The downturned end of the spring 88 pushes the end 89 of the lever 80 so as to cause the U-shaped member 78 to disengage the bevel gears 79 and 103.

The contact spring 88 that rotates with the cog wheel 92 glides over electric contact pieces 90 which are fixedly mounted on a stationary insulating plate 91. Each of the contact pieces 90 corresponds with a position of the shutter speed selector knob 97. The current from the photo responsive cell passes through a resistance which is set automatically by the respective contacts 90 so that the amount of the deflection of the pointer 17 is determined not only by the amount of light striking the light cell but also by the amount of resistance in the electric circuit as determined by the particular contact 90 upon which the contact spring 88 rests, which particular contact is determined by the position of the speed selector knob 97. Thus the current from the photo-cell passes through the contact spring 88 to the contact piece 90 and thereby through the selected resistance into the coil 13 of the electric instrument. The circuit might be wired at will, either in series or in parallel, and may utilize an additional variable resistance 116 controlled by a contact spring 117 turned by the knob 118. The resistance 116 is provided to alter the deflection of the pointer 17 as determined by one additional factor, namely, the various film sensitivity. The electric circuits for accomplishing this result are known in the art and are shown here solely to demonstrate how the parts are mounted on the camera and how the various members of my automatic camera use these known principles.

An explanation will now be given of the manner of operation of the mechanism thus far described. The operator having set the shutter speed selecting knob 97 to the desired position, and turned the finger plate 9 of the operating lever 7 to project outwardly, then turns the operating lever in 7 a clockwise direction, as indicated by the arrow B of Figure 2. The operating lever turns the main actuating lever 64 in the same direction, that is, in the direction indicated by the arrow B' of Figure 2, or by the arrow P of Figure 3. Upon the initial rotation of the main actuating lever 64 from the position illustrated in Figure 2 it first clears the wedge-shaped wall 53 of the lug 27 at the top of the supporting plate 20. This permits the frame 21 to swing the supporting plate 20, under the action of the spring 23, from the position illustrated in Figure 4 to the position illustrated in Figure 5, that is, in the direction illustrated by the arrow K of Figure 3. The frame 21 swings in this direction until the lugs or stopping members 38 thereof abut against the adjustably set stopping pins 24. In this position the supporting plate 20 just contacts the back of the plate 18 at the top of the galvanometer pointer 17. While this is taking place the lug 47 on the arm 31 rides against the tapered surface 33 of the rim 34 on the end of the frame 35 thus forcing the frame 35 to swing in the direction of the arrow L. The arrangement of the tapered surfaces 53 and 33 are such that the supporting plate 20 reaches the position illustrated in Figure 5 appreciably before the counterplate 36 moves the distance D. As the counterplate 36 approaches its final position one pin 26a (or perhaps two adjacent pins) abut against the front surface of the plate 18. The remaining pins enter the groove 19 in the supporting plate 20. The continued motion of the counter-plate 36 causes the pin 26a to glide or slide in the counter-plate to the position illustrated in Figure 5. Continued actuation of the main actuating lever 64 is of no effect upon either the plate 20 or the plate 36, those plates remaining in the positions illustrated in Figures 3 and 5.

As the operation of the lever 7 is continued and the main actuating lever 64 continues to move, the spring plate 48 on the arm 31 bears against the nose piece 50 of the pawl 51 (Fig. 2) and rotates the disc 62 in the direction indicated by the arrow A in Figure 2. The disc 62 rotates the pinion 71 and the sleeve 72, thus rotating the bevel gear 79 which is in mesh with and rotates the bevel gear 103 (Fig. 2), in the direction indicated by the arrow D. The gear 103 is secured on a sleeve 105 that is journalled on the shaft or pin 104 secured to the housing of the camera. The sleeve 105 carries a pinion 106 which is in mesh with a gear 107 which is thus rotated in a direction indicated by the arrow E of Figure 2. The gear 107 is mounted on a sleeve 108 which adjusts the diaphragm iris. The sleeve 108 bears the numbers of the diaphragm openings and is adjustably mounted within a fixed member 111 which bears an adjusting mark 110. The pinion 106 is considerably broader than the gear 107 so as to enable the gear to move axially whenever the focus is adjusted while maintaining the meshing engagement with the pinion 106. The focus adjustment is obtained in the usual manner, as by turning a wheel 112 which is connected to a sleeve 113 that bears the usual distance marks which turn past a pointer 114 fixed on an immovable part 115 of the camera. Thus the gear 107 is always in mesh with the pinion 106 independently of the telescoping lens system necessary for manual focusing of the camera.

So long as the disc 62 is moving in the direction of the arrow A' it is reducing the diaphragm opening.

The disc 62 remains coupled with the lever 64 and moves therewith in the same direction until the bottom or lug 57 of the pawl 51 abuts against the pin head 42a of the particular pin 26a which protrudes from the counter-plate 36. In this position continued movement of the lug 57 is prevented so that as the spring 48 of the main actuating lever 64 continues to move, it causes the pawl 51 to swing about the pivot 54 in a direction indicated by the arrow R of Figure 3, thus causing the nose piece 50 to escape from beneath the ratchet spring 48 and uncouple the disc 62 from the main actuating lever 64. The disc 62 then remains in the position illustrated in Figure 3, as the main actuating lever 64 is further rotated by the hand operating lever 7. The continued rotation of the main actuating lever 64 is momentarily of no effect. The lever 64 thus travels alone until finally the bar 31 hits a hook 123 of a shutter release lever 121 (Fig. 2), and then moves that lever in the direction of the arrow M. The shutter release lever 121 is connected by a pin 120 which slides in a slot 119 of the camera casing and operates the shutter release. Thus a single continuous movement of the lever 7 causes first a setting of the diaphragm iris and then a snapping of the picture.

The main actuating lever 64 is released by letting go of the lever 7. The spring 67, which was tensioned by the operating movement of the main actuating lever 64, now moves the lever 64 in the opposite direction. The actuating lever 64 has a pin 63 which ultimately is moved into abutment with the inner side of the arm 61 of the disc 62 and thereby pulls the latter back to its original position and resets the diaphragm opening to its maximum size. The contact between the pin 63 and the arm 61 is, however, established after the spring plate 48 of the bar 31 has snapped over the rounded nose 50 of the pawl 51. Thus on the return stroke the actuating arm 31 reestablishes the interrupted connection with the disc 62 and pushes the latter back by means of the pin 63. In the last stage of the return movement of the main actuating lever 64 the arm 47 thereof clears the wedge-shaped end 33 of the rim 34 of the counter-plate 36, thus allowing the counter-plate to move back to the position illustrated in Figure 4. Also, the lug 29 of the arm 31 rides against the inclined surface 53 of the lug 27 and moves the supporting plate 20 from the position illustrated in Figure 5 to that illustrated in Figure 4, thus completely restoring the automatic mechanism.

By use of the present automatic camera the operator can ascertain the diaphragm opening corresponding to the selected speed, under prevailing light conditions, before the picture has been snapped and can avoid snapping the picture if the proper diaphragm opening is not such as will give him the requisite depth of focus, etc. For instance, assume that the speed selector 97 has been set arbitrarily for one hundredth of a second. Assume that under the prevailing light conditions the diaphragm opening should be set at F9. The operator may prefer a larger opening in order to have a lesser depth of focus. The initial operation of the lever 7 causes the plates 20—36 to move towards one another and causes the disc 62 to operate the gears to adjust the diaphragm. When the disc 62 abuts against the protruding pin head 42a and becomes disengaged from the lever 64, the resistance to motion of the lever 64 is appreciably reduced. The operator now knows that his diaphragm has been set. The lever 64 now moves by the application of a very light pressure to the finger piece 9 until the lever engages the hook 123 of the shutter release lever. At this time the operator feels a perceptible resistance to motion. If the operator does not move the finger piece 9 further, no picture will be taken. The operator can then read the markings on the sleeve 108 and thus ascertain the diaphragm opening. If this is unsatisfactory to the operator he need merely release the lever 7 and the mechanism will be restored to its initial position without exposure of the film. The operator can then reset the shutter speed selecting knob 97 for a different speed to get a different diaphragm opening upon subsequent operation of the lever 7.

The mechanism of the present invention provides an additional feature of control. In case the maximum opening of the diaphragm should result in an insufficient amount of light at the selected shutter speed, locking means is provided to prevent operation of the shutter release and to apprise the operator of this fact. The amount of deflection of the pointer 17 is a function of the light conditions and the setting of the shutter speed selecting knob 97. If the light is insufficient for picture taking purposes at the selected speed there will be a very small or no deflection of the pointer 17. The first pin of the group of pins carried by the counter-plate 36 is provided for stopping the mechanism. This pin carries a pin head 43, illustrated in Figure 3. If the pointer plate 18 happens to be in its original position (current too low) then upon actuation of the main operating lever 64 and movement of the counter-plate 36 the pin head 43 is caused to protrude. This pin head carries a lug 44 which rests in a slot 45 in the rim of the counter-plate 36. In case the pin head 43 protrudes then this lug 44 swings into the path of the part 47 of the actuating lever 64 and blocks the lever 64. The operator is thus immediately aware of the fact that there is insufficient light for making a picture at the speed selection. He may then move the shutter speed selecting knob 97 to a lower speed position and again try to depress the lever. In this case, if there should be sufficient light for taking a picture at the lower speed, then the pointer 17 will swing out beyond the first pin 26 and the main actuating lever 64 can be depressed to take the picture. The first pin 26 and its lug 43 thus serve as a zero position for the pointer and prevent exposure of the film by the automatic mechanism whenever the pointer 17 is in its zero position. If there is insufficient light to prevent taking a picture at one twentieth of a second and the maximum available lens opening, then no snap shot can be taken with the automatic diaphragm adjustment.

In order to permit snapping a picture under such conditions even though it would be under exposed, the disruptable connection between the gear 79 and the gear 103 may be brought into play. The operator moves the button 84 to the slot portion 87 in the manner previously described, to disrupt the connection between the gears 79—103. The diaphragm opening E may then be left at its maximum opening or adjusted to any other effective opening. The shutter release lever 121 may then be actuated manually, as by a bell crank lever 124 pivoted at a stationary pivot 125. One end of the lever extends through a slot in the camera casing and has an actuating finger plate 126. The opposite end of the lever is pinned to the shutter release lever 121 by a pin 122. Thus, depressing the finger piece 126 causes tripping of the shutter independently of the automatic mechanism.

In the event that there is insufficient light for a snap shot and it is desired to take a time exposure rather than an under exposed shot, the shutter speed selecting knob 97 is set to its "B" position in the usual manner, which uncouples the gears 79—103, thus disconnecting the automatic mechanism from the diaphragm adjusting gear 107. It is then possible to make a time exposure by depressing the finger piece 126 and holding it down the requisite amount of time before releasing it. A cable attachment 128 having a threaded cable receiver 127 is provided to permit use of the usual cable attachments for depressing the finger piece 126.

When the shutter speed selector knob 97 is set to "B" position, which is the time exposure position, the electric properties of the circuit are changed so as to give the pointer system its maximum sensitivity. In order to permit utilization of the pointer system as a light meter a hole is provided in the side wall of the cover of the mechanism, as illustrated in Figure 1, through which position the pointer 17 may be observed and compared with marks on the supporting plate 20. These marks may be calibrated to indicate the proper or necessary opening of the diaphragm for taking a picture with a predetermined time exposure, for instance, an exposure of five seconds, or any other fixed amount. These marks on the plate 20 would then immediately indicate which value the diaphragm would have to be set to by hand (since the automatic connection has been interrupted) for taking a proper picture under the prevailing light conditions with an exposure time of five seconds. Thus after the speed selector has been set to the "B" position the pointer acts as an exposure meter instead of automatically controlling the diaphragm adjustment. The operator is thus enabled to use the values given by the exposure meter according to its own discretion. In this case the manual operating lever 7 may serve for actuating the exposure, that is, by depressing the lever 7 and holding it depressed for the requisite time.

Since the automatic diaphragm adjusting connection has been interrupted by withdrawal of the bevel gear 79 it might be that the predetermined "standard" exposure time of "B," that is, for instance, five seconds, is not sufficient to expose the film correctly. In this case, in spite of the now increased sensitivity of the recording instrument, the pointer would still remain in its zero position. In this position, as explained above, the locking device 44 would prevent actuation of the operating lever. This would immediately apprise the operator that an exposure time of more than five seconds is necessary. He can then operate the camera at the greater exposure time by operating the finger piece 126, as heretofore explained.

The construction of the camera herein illustrated follows a commercially known type. The body 99 conceals the film roll and the film winding mechanisms combined with the shutter. The view finder consists of a mirror which is in a tilted position in the body 100 of the camera, and operates on the well known "reflex" principle used in cameras of this type, the arrangement being such that the mirror is swung away whenever the shutter is released. The film winding knob 102 serves to wind up the shutter spring.

It is desirable that the photo cell should deliver current only when the operator is about to make a picture. In reflex type cameras of the kind here illustrated this is achieved very readily by providing a spring contact or the like which is actuated by the view finder 101. If the view finder is opened the switch establishes connection between the photo cell and the galvanometer or millivoltmeter. In other types of cameras the circuit connections for the galvanometer may be established by a switch which is actuated in response to forward movement of the sleeve 113 of the lens, that is, when the lens is projected forward for picture taking purposes.

It is to be pointed out that it is within the purview of the present invention to provide a mechanical connection to automatically disconnect the locking device whenever the lever 80 is actuated to interrupt the connection between the automatic regulating system and the diaphragm of the camera. In this case the second shutter release could be entirely omitted and the shutter could be actuated at all times by the operating lever 7. This, however, would be less advantageous as under such circumstances it would not be possible to use a cable release because the angle through which the operating lever 7 must be turned is too great for a cable release. Consequently the rule is that whenever the automatic adjustment is disconnected the shutter should be tripped by the second shutter release lever 124.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. In a camera having a mechanical adjustment of the iris opening controlled by a swinging pointer of an electric instrument that is actuated by the current set up by a photo electric cell according to the intensity of existing light to a position determined by the light intensity, variable abutment means movable against the pointer whereby the ultimate position of the abutment means is determined by the position of the pointer, means controlled by the abutment means for adjusting the iris opening in accordance with the position of the abutment means, said camera including a variable shutter speed selector, means controlled by the selector for disabling the iris opening adjusting means in a predetermined selector position, and shutter tripping means operable even when the abutment controlled iris adjusting means is disabled.

2. In a camera having a mechanical adjustment of the iris opening controlled by a swinging pointer of an electric instrument that is actuated by the current set up by a photo electric cell according to the intensity of existing light to a position determined by the light intensity, variable abutment means movable against the pointer whereby the ultimate position of the abutment means is determined by the position of the pointer, means controlled by the abutment means for adjusting the iris opening in accordance with the position of the abutment means, said camera including a variable shutter speed selector, means controlled by the selector for disabling the iris opening adjusting means in a predetermined selector position, manually operable means independent of the selector for also disabling the iris opening adjusting means, and shutter tripping means operable even when the abutment controlled iris adjusting means is disabled.

3. In a camera having a mechanical adjustment of the iris opening controlled by a swinging pointer of an electric instrument that is actuated by the current set up by a photo electric cell according to the intensity of existing light to a position determined by the light intensity, a support on one side of and adjacent to the surface developed by the tip end of the swinging pointer, said support being sufficiently spaced from said surface to allow adequate clearance for the pointer even though the pointer may tilt at right angles to its direction of swing, means for moving the support into a position just abutting said surface, whereby said support acts as a backing for the pointer, variable abutment means movable against the pointer and towards the support whereby the ultimate position of the abutment means is determined by the position of the pointer and the support maintains the pointer against stress, means controlled by the abutment means for adjusting the iris opening in accordance with the position of the abutment means, said camera including a variable shutter speed selector, and means controlled by the selector for disabling the iris opening adjusting means in a predetermined selector position.

4. In a camera having a mechanical adjustment of the iris opening controlled by a swinging pointer of an electric instrument that is actuated by the current set up by a photo electric cell according to the intensity of existing light to a position determined by the light intensity, a support on one side of and adjacent to the surface developed by the tip end of the swinging pointer, said support being sufficiently spaced from said surface to allow adequate clearance for the pointer even though the pointer may tilt at right angles to its direction of swing, means for moving the support into a position just abutting said surface, whereby said support acts as a backing for the pointer, variable abutment means movable against the pointer and towards the support whereby the ultimate position of the abutment means is determined by the position of the pointer and the support maintains the pointer against stress, means controlled by the abutment means for adjusting the iris opening in accordance with the position of the abutment means, said camera including a variable shutter speed selector, means controlled by the selector for disabling the iris opening adjusting means in a predetermined selector position, and manually operable means independent of the selector for also disabling the iris opening adjusting means.

5. In a camera having a mechanical adjustment of the iris opening controlled by an electric instrument that is actuated by the current set up by a photo electric cell according to the light intensity, variable abutment means controlled by the instrument whereby the ultimate position of the abutment means is determined by the light intensity, means controlled by the abutment means for adjusting the iris opening in accordance with the position of the abutment means, said camera including a variable shutter speed selector, and means controlled by the selector for disabling the iris opening adjusting means in a predetermined selector position.

6. In a camera having a mechanical adjustment of the iris opening controlled by an electric instrument that is actuated by the current set up by a photo electric cell according to the light intensity, variable abutment means controlled by the instrument whereby the ultimate position of the abutment means is determined by the light intensity, means controlled by the abutment means for adjusting the iris opening in accordance with the position of the abutment means, said camera including a variable shutter speed selector, means controlled by the selector for disabling the iris opening adjusting means in a predetermined selector position, and manually operable means independently of the selector for also disabling the iris opening adjusting means.

7. In a camera having an electric instrument that is actuated by current set up by a photo electric cell according to the light intensity, variable abutment means movable to a position controlled by the instrument whereby the ultimate position of the abutment means is determined by the light intensity, means for adjusting the iris opening, an operating lever, a releasable driving connection between said adjusting means and said lever whereby the operating lever operates the adjusting means until the driving connection is released and then ceases to operate the adjusting means, means controlled by the abutment means for releasing the driving connection in a variable position determined by the ultimate position of the abutment means, means operated by the lever near its limit of motion for tripping the camera shutter, and means effective upon reverse movement of the lever from any position subsequent to the release of the driving connection for reestablishing the connection and resetting the adjusting means after a prior setting and before operation of the camera shutter.

8. In a camera having an electric instrument that is actuated by current set up by a photo electric cell according to the light intensity, variable abutment means movable to a position controlled by the instrument whereby the ultimate position of the abutment means is determined by the light intensity, means for adjusting the iris opening, an operating lever, a releasable driving connection between said adjusting means and said lever whereby the operating lever operates the adjusting means until the driving connection is released and then ceases to operate the adjusting means, means controlled by the abutment means for releasing the driving connection in a variable position determined by the ultimate position of the abutment means, means operated by the lever near its limit of motion for imparting a perceptible increase in the resistance to motion of said lever and upon overcoming of said additional resistance to motion for tripping the camera shutter, and means effective upon reverse movement of the lever from any position subsequent to the release of the driving connection for reestablishing the connection and resetting the adjusting means after a prior setting and before operation of the camera shutter.

9. In a camera having a mechanical adjustment of the relationship of the iris opening to the shutter speed controlled by a swinging pointer of an electric instrument that is actuated by the current set up by a photo electric cell according to the intensity of existing light to a position determined by the light intensity, a support on one side of and adjacent to the surface developed by the tip end of the swinging pointer, said support being sufficiently spaced from said surface to allow adequate clearance for the pointer even though the pointer may tilt at right angles to its direction of swing, means for moving the support into a position just abutting said surface, whereby said support acts as a backing for the pointer, variable abutment means movable against the pointer and towards the support whereby the ultimate position of the abutment means is determined by the position of the pointer and the support maintains the pointer against stress, an operating lever, means for adjusting the relationship of the iris opening to the shutter, a releasable driving connection between said adjusting means and said lever whereby the operating lever operates the adjusting means until the driving connection is released and then ceases to operate the adjusting means, and means controlled by the abutment means for releasing the driving connection in a variable position determined by the position of the pointer.

10. In a camera having a mechanical adjustment of the relationship of the iris opening to the shutter speed controlled by a swinging pointer of an electric instrument that is actuated by the current set up by a photo electric cell according to the intensity of existing light to a position determined by the light intensity, a support on one side of and adjacent to the surface developed by the tip end of the swinging pointer, said support being sufficiently spaced from said surface to allow adequate clearance for the pointer even though the pointer may tilt at right angles to its direction of swing, said support having a groove over which the tip of the pointer moves, means for moving the support into a position just abutting said surface, whereby said support acts as a backing for the pointer, variable abutment means including side by side spring pressed pins movable towards the support and into the groove whereby the pin opposite the pointer is prevented from entering the groove and presses the pointer towards the support while the support maintains the pointer against stress, and means controlled by the pin that is prevented from entering the groove for adjusting the relationship of the iris opening to the shutter in accordance with the position of the abutment means.

11. In a camera having a mechanical adjustment of the relationship of the iris opening to the shutter speed controlled by an electric instrument that is actuated by the current set up by a photo electric cell according to the light intensity, an operating lever, variable abutment means movable by the lever to a position determined by the electric instrument whereby the ultimate position of the abutment means is determined by the light intensity, means for adjusting the relationship of the iris opening to the shutter speed, a releasable driving connection between said adjusting means and said lever whereby the operating lever operates the adjusting means until the driving connection is released and then ceases to operate the adjusting means, means controlled by the abutment means for releasing the driving connection in a variable position determined by the ultimate position of the abutment means, means operated by the lever near its limit of motion for tripping the camera shutter, means for locking the lever against movement to the shutter tripping position when the electric instrument is actuated less than a predetermined minimum amount, said camera including a shutter speed selector, means controlled by the selector for disabling the adjusting means when the selector is in one predetermined position, and means for increasing the sensitivity of the electric instrument when the selector is placed in said one position.

12. In a camera having a mechanical adjustment of the relationship of the iris opening to the shutter speed controlled by a swinging pointer of an electric instrument that is actuated by the current set up by a photo electric cell according to the intensity of existing light to a position determined by the light intensity, a support on one side of and adjacent to the surface developed by the tip end of the swinging pointer, said support being sufficiently spaced from said surface to allow adequate clearance for the pointer even though the pointer may tilt at right angles to its direction of swing, an operating lever, means controlled by the lever for moving the support into a position just abutting said surface, whereby said support acts as a backing for the pointer, variable abutment means movable by the lever against the pointer and towards the support after the support has been positioned abutting said surface whereby the ultimate position of the abutment means is determined by the position of the pointer, and the support maintains the pointer against stress, means for adjusting the relationship of the iris opening to the shutter speed, a releasable driving connection between said adjusting means and said lever whereby the operating lever operates the adjusting means until the driving connection is released and then ceases to operate the adjusting means, means controlled by the abutment means for releasing the driving connection in a variable position determined by the ultimate position of the pointer, means operated by the lever near its limit of motion imparting a perceptible increase in the resistance to motion of said lever and upon overcoming said additional resistance to motion for tripping the camera shutter, means effective upon reverse movement of the lever from any position subsequent to the release of the driving connection for reestablishing the connection and resetting the adjusting means after a prior setting and before operation of the camera shutter, said camera including a shutter speed selector, means for locking the lever against movement to the shutter tripping position when the movement of the pointer is less than a predetermined minimum amount, means controlled by the selector for disabling the adjusting means when the selector is in one predetermined position, and means for increasing the sensitivity of the electric instrument when the selector is placed in said one position.

EUGENE R. KUN.